(12) United States Patent
Huang

(10) Patent No.: US 7,132,632 B2
(45) Date of Patent: Nov. 7, 2006

(54) HIGH FREQUENCY INDUCTION HEATER BUILT IN AN INJECTION MOLD

(75) Inventor: Jung-Tang Huang, Tao-Yuan Hsien (TW)

(73) Assignee: U-Tech Media Corp., Tao-Yuan Hsien (TW)

( * ) Notice: Subject to any disclaimer, the term of this patent is extended or adjusted under 35 U.S.C. 154(b) by 315 days.

(21) Appl. No.: 10/708,333

(22) Filed: Feb. 25, 2004

(65) Prior Publication Data
US 2004/0188427 A1     Sep. 30, 2004

(30) Foreign Application Priority Data
Mar. 24, 2003  (TW) .............................. 92106436 A

(51) Int. Cl.
H05B 6/06     (2006.01)
H05B 6/10     (2006.01)
B22D 17/22    (2006.01)

(52) U.S. Cl. ...................... 219/635; 219/667; 219/647; 219/659; 425/174.8 R; 216/52

(58) Field of Classification Search ................ 219/635, 219/667, 647–649, 650, 659; 425/174, 174.8 R, 425/174.8 E; 216/52
See application file for complete search history.

(56) References Cited

U.S. PATENT DOCUMENTS 4,726,751 A * 2/1988 Shibata et al. ............... 425/144
6,164,952 A * 12/2000 Asai ............................ 425/542
6,290,882 B1 * 9/2001 Maus et al. ................... 264/2.2

FOREIGN PATENT DOCUMENTS

JP        2002-18356     *  8/2000

* cited by examiner

*Primary Examiner*—Philip H. Leung
(74) *Attorney, Agent, or Firm*—Winston Hsu

(57) ABSTRACT

A high frequency induction heater built in an injection mold. The high frequency induction heater has a metal or silicon mold-insert, at least a heating module and at least a thermometer detector. The elements are reasonably fit with the mold-insert utilizing well-defined MEMS technology and UV-LIGA process. The high frequency induction heater is employed to apply a local heat for a microstructure of mold-insert during the micro molding process. By using the high frequency induction heater a fluid mold flow and high aspect ratio replication is achieved.

9 Claims, 21 Drawing Sheets

HIGH FREQUENCY INDUCTION HEATER BUILT IN AN INJECTION MOLD

BACKGROUND OF INVENTION

1. Field of the Invention

The present invention relates to a high frequency induction heater built in an injection mold for applying a local heat to the plastic, and more specifically, to a high frequency induction heater formed on a side of a stamper by micro electromechanical system (MEMS) technologies.

2. Description of the Prior Art

The injection compression molding technology has become mature in recent years. The injection compression molding technology combines the injection molding technology with the compression molding technology. The injection compression molding technology reduces the injection pressure required when filling the plastic into the cavity. In addition, since the pressure of the melting plastic in the cavity is equally distributed, thus a sink head or a warp problem is prevented. Therefore, the shrinkage of the product is well controlled, in light or the above-mentioned advantages, the injection compression molding technology is normally employed in fabricating optical precision moldings or compact discs. For example, if the compact disc is fabricated by conventional injection molding technology, the plastic cannot be filled completely, which is known as short shot. Thus, thin moldings having large areas, such as compact discs, cannot be formed by conventional injection molding technology. At present, the compact discs are fabricated by injection compression molding technology combining with hot runner design. Since the temperature of the plastic in the sprue is relatively higher, the short shot problem is therefore avoided. U.S. Pat. No. 6,164,952 discloses a method or fabricating DVD discs using injection compression molding technology, in this patent, an inclined angle design is adopted in the cavity for improving the fluidity of the plastic. It is possible to fabricate thin moldings having large areas (diameter: 120 mm; thickness: 0.6 mm) by injection compression molding technology. However, if thinner moldings having larger areas and being coplanar (inclined angle design is not allowed) are desired, or die pattern of die stamper is more complicated (such as the molding includes via holes), and the following problem may occur: If a single sprue method is employed, the plastic cannot be completely filled into the cavity.

2. If a multiple sprue method is employed, and the temperature distribution of the molding is not equal, then the molding may have warps after being cooling.

3. The plastic flow is obstructed and split so that a seam line will generate after the plastic flow converges.

4. Since the molding has large area and thin thickness, if the fluidity of the plastic is not good, the pattern of the microstructure in the stamper will be ruined by the applied pressure.

Generally speaking, 3D micro moldings require precise micro molding injection technology. At present, one of the methods to fabricate 3D micro moldings is carried out by a micro injection machine. The micro injection machine is one of the methods to fabricate complicated and micro plastics, ceramics, and metal parts. Technologically, the injection molding technology is the first choice for fabricating 3D products with a complicated shape. Basically, the micro injection molding technologies are simply classified into 3 types: microstructure injection molding technology, micrometer-level injection molding technology, and micro injection molding technology. All of the three technologies have to overcome the problems such as micro injection machine design, micro mold manufacturing, micro mold flow analysis, micro injection process monitoring, etc. For example, the requirements for the processes of the micro injection machine are listed as follows:

1. An injection machine under 20 tons or a micro injection machine is required.

2. Short detention time is necessary for avoiding the degradation of the plastic.

3. Long injection stroke: the diameter of the screw must be as small as possible (generally the diameter of the screw of the micro injection machine is 4 mm).

4. A long and thin plunger is required.

5. High shear stress is required to lower the viscosity of the plastic.

6. High injection pressure filling is required due to a high flow length/wall thickness ratio and micro channel.

One of the largest shortcomings for the micro injection molding technology is that a precise micro injection machine is required. In addition, the design and manufacturing of the micro injection mold is not standardized yet, thus the number of the molding products cannot reach a mass amount during one single process.

In Japan Patent JP2000-218356, an external heater with sensors is employed to detect the temperature of the movable mold-half and the stationary mold-half and to heat the movable mold-half and the stationary mold-half when the mold is open. Since the fluidity of the melting metal is improved, the metal moldings having complicated structure and large areas can be formed. However, if this method is employed to form plastic moldings having complicated structure and large areas, the following problems may occur:

1. Since the mold is heated when it is open, it is easy for the mold to have an unequal temperature distribution.

2. This method is employed to inject metal material, thus the temperature is too high for plastic materials.

3. This method heats the mold entirely, thus the mold cannot be heated locally according to this method.

4. The mold is heated only when the mold is open, thus the mold temperature is controlled by prediction.

In light of the above-mentioned problems, the present invention forms a high frequency induction heater on a side of the stamper by MEMS technology. The high frequency induction heater provides two main functions. First, the high frequency induction heater applies a local heat to sections of the plastic having a thin thickness or sections having a large difference of cross sectional areas so that the plastic remains fluid. Second, when the temperature of the plastic molding is not equally distributed, the high frequency induction heater can adjust the overall temperature so that the temperature difference is reduced.

In MEMS industries, since the precise injection molding technology is mature and the cost of plastic material is cheap, polymers such as plastics are used to fabricate housings or covers. For a long time, optical wafers, bio wafers, and communication passive devices are fabricated by LIGA technology and hot embossing molding. Hans-Dieter Bauer et al. produces optical waveguide devices by LIGA technology and hot embossing molding. Since the refractive index is one of the key factors that influence the transmission of light, the precision and accuracy of the size and relative position of the optical waveguide device is important. Generally speaking, the hot embossing molding can form the optical waveguide device. However, the hot embossing molding technology cannot apply an equal pressure so that the moldings having complicated structure and large areas are not easy to be formed. In addition, the production rate is not outstanding, and the microstructure of the hot embossing mold is easy to be broken when being pressurized.

The present invention forms a high frequency induction heater on a side of the stamper such that moldings having a microstructure or large areas, such as optical wafers, bio wafers, and communication wafers, can be well defined. In combination with a substrate having MEMS devices or ICs thereon, a wafer-level package can be made. In such case, the cost of individual package will be enormously reduced.

SUMMARY OF INVENTION

It is therefore a primary objective of the present invention to provide a high frequency induction heater built in a stamper of an injection mold having a microstructure thereon. The magnetic permeability or the induction heating ability of the material of the microstructure is higher than that of the material of the stamper, thus the high frequency induction heater can apply heat to the microstructure through the stamper.

It is another objective of the present invention to form a high frequency induction heater by MEMS technology on the stamper and apply a local heat to the plastic such that sections of the plastic having a thin thickness or sections having a large difference of cross sectional areas remains fluid.

It is another objective of the present invention to solve the problems of seamline, inadequate filling, and unequal temperature distribution of the moldings fabricated by conventional injection molding technology.

It is another objective of the present invention to solve the low fluidity problem of the plastic due to thin thickness and to achieve sub-millimeter lever injection molding.

It is another objective of the present invention to fabricate wafer-level plastic discs (6 to 8 inches), and perform wafer-level packaging in combination with substrates having ICs or MEMS devices thereon.

It is another objective of the present invention to install a stamper and a high frequency induction heater on the movable mold-half, and to install a corresponding stamper on the stationary mold-half as well. In such case, 3D injection molding can be achieved to fabricate 3D moldings such as 3D gears by injection compression molding technology. In addition, the productivity is improved, and a micro injection machine is not required.

These and other objects of the present invention will be apparent to those of ordinary skill in the art after having read the following detailed description of the preferred embodiment that is illustrated in the various figures and drawings.

DETAILED DESCRIPTION

Figure 1:
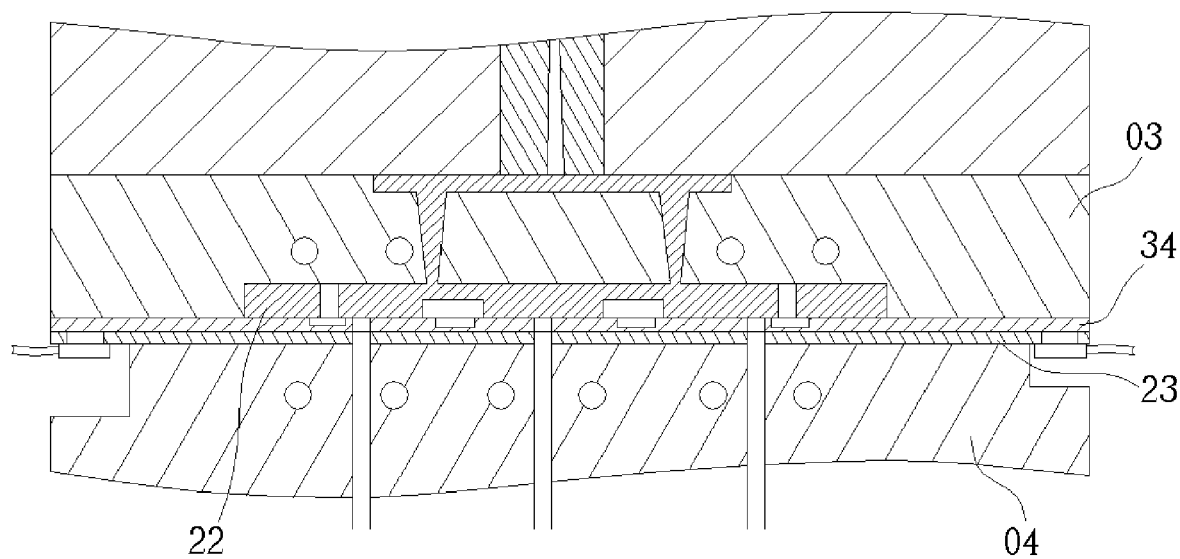
FIG. 1 is a schematic diagram of an injection mold of the present invention.
Figure 2:
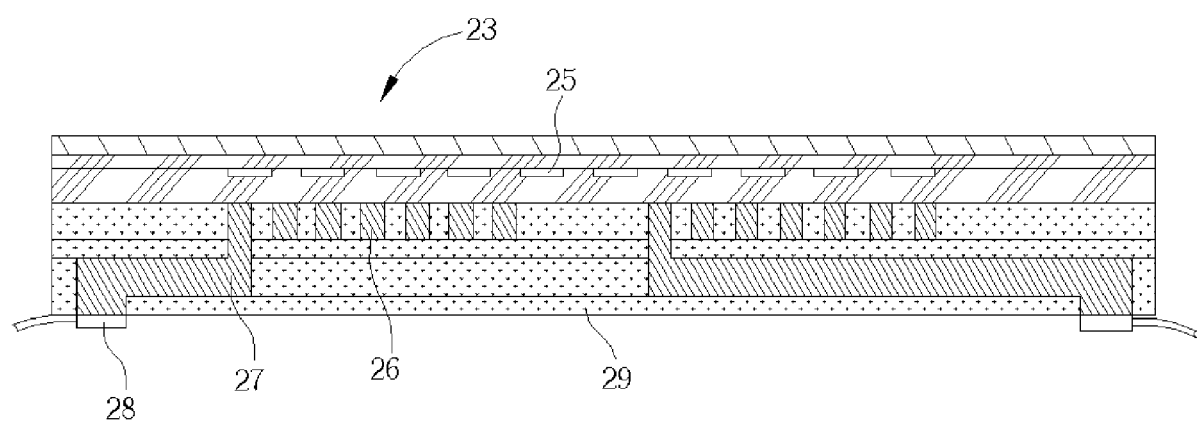
FIG. 2 is a schematic diagram of a high frequency induction heating module of the present invention.
Figure 3:
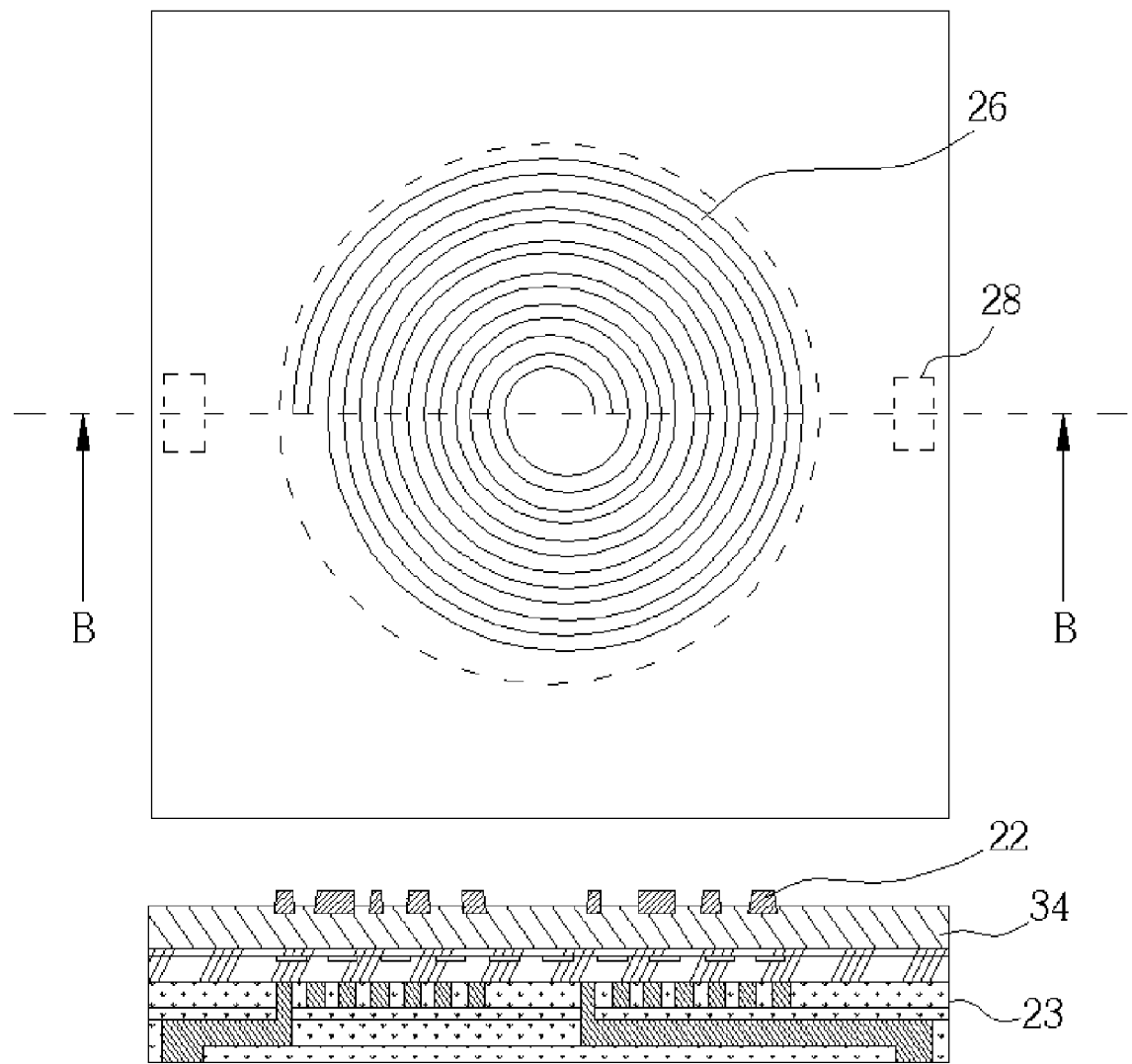
FIG. 3 and FIG. 4 are schematic diagrams of the high frequency induction heating module and a stamper.
Figure 4:
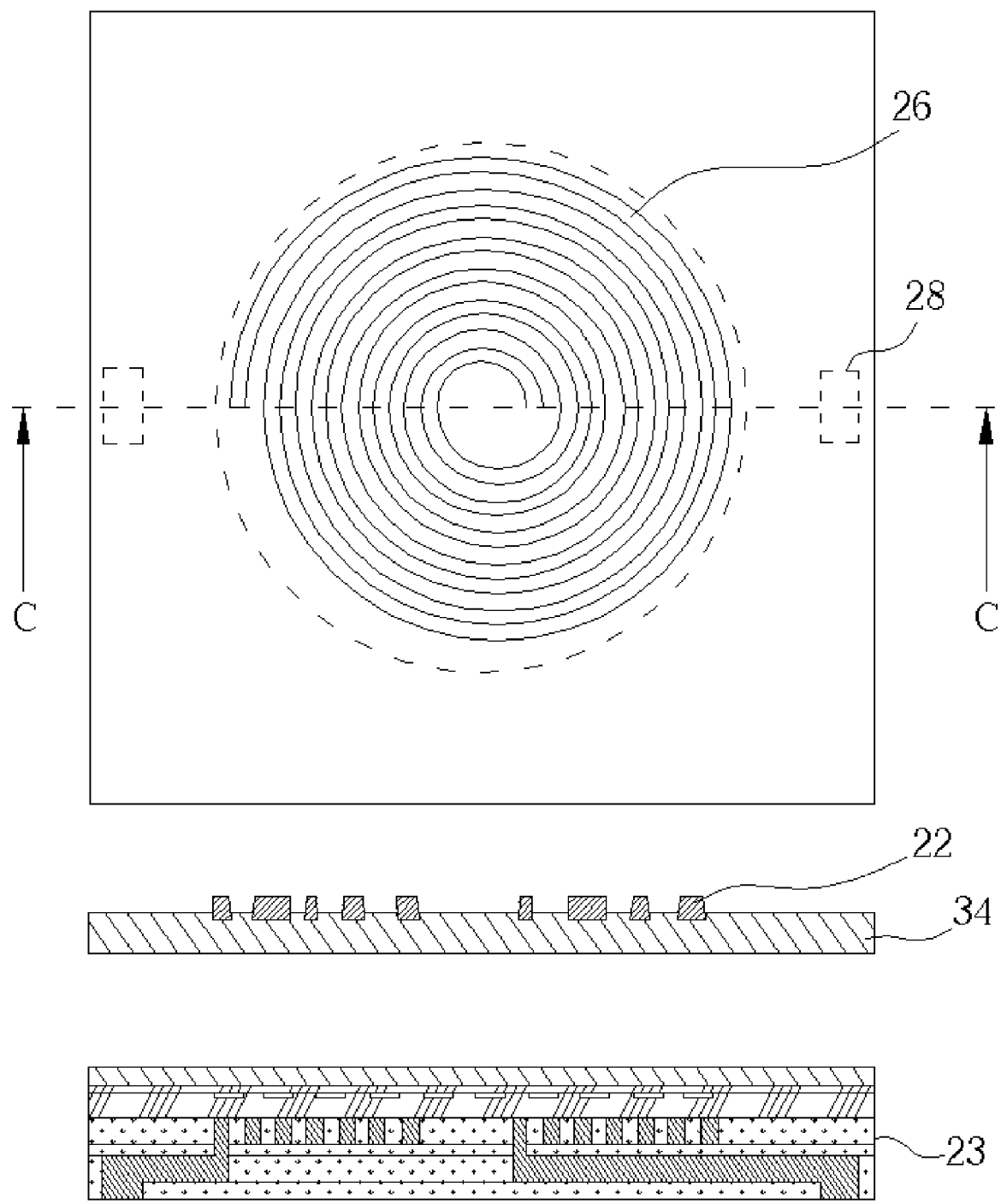

Please refer to FIG. 1 and FIG. 2. FIG. 1 is a schematic diagram of an injection mold of the present invention. FIG. 2 is a schematic diagram of the high frequency induction heating module of the present invention. As shown in FIG. 1 and FIG. 2, the injection mold comprises a stationary mold-half 03, a movable mold-half 04, a stamper 34, and a high frequency induction heating module 23 installed on the movable mold-half 04 for applying a local heat to the plastic flowing in a cavity 22. In such case, the plastic is heated and remains fluid. The high frequency induction heating module 23 comprises a plurality of thermometer detectors 25, a plurality of high frequency induction heating coils 26, a plurality of via holes 27, and an external power circuit terminal 28. It is worth noting that there are several ways to arrange the relative position of the high frequency induction heating module 23 and the stamper 34. For example, please refer to FIG. 3. FIG. 3 is a schematic diagram of the high frequency induction heating module 23 and the stamper 34. As shown in FIG. 3, the high frequency induction heating module 23 is formed on one side of the stamper 34, and the microstructure of the cavity 22 is formed on the other side of the stamper 34. Therefore, the high frequency induction heating module 23 and the stamper 34 are a uniform-forming structure. In another example, please refer to FIG. 4. FIG. 4 is another schematic diagram of the high frequency induction heating module 23 and the stamper 34. As shown in FIG. 4, the high frequency induction heating module 23 and the stamper 34 are fabricated separately.

The details of the above-mentioned embodiments are shown as follows. First, a mold flow analysis is performed to decide the sprue method, the amount and position of sprues. Also in the mold flow analysis, the flowing condition of the plastic and the temperature/pressure distributions are observed for knowing where the thickness is thinner or where the seamline occurs easily. For example, if the thin molding has large areas, a multi sprues method is adopted. If necessary, a hot runner is also required.

Then a layout design of high frequency induction heating coils 26 is carried out. The position of the high frequency induction heating coils 26 is decided according to the temperature distribution of the mold flow. Since the high frequency induction heating coils 26 can be arranged in circles, and a plurality of thermometer detectors 25, such as platinum resistance thermometer detector (RTD), can be installed if necessary. Each high frequency induction heating coil 26 is controlled by an external power circuit (not shown). The desired heating temperature is controlled by the thermometer detectors 25 so that deformation of molding products due to high temperature difference is prevented.

As shown in FIG. 3, three sets of high frequency induction heating coils 26 are arranged spirally. However, the arrangement of the high frequency induction heating coils 26 is not limited by this embodiment. In addition, the number of the heating coils 26 and the external power circuits can also be changed. Any designs that can apply a local heat and control the overall temperature of the stamper 34 for preventing the seamline is allowed. The high frequency induction heating coils 26 generate a magnetic field for heating the microstructure of the stamper 34. Generally, copper (Cu) is selected as the material of the high frequency induction heating coils 26. The more and the closer the high frequency induction heating coils 26 are, the stronger the magnetic field is. And therefore the heating ability is better. It is worth noting that all the high frequency induction heating coils 26 are insulated by the thick photoresist pattern (SU8), thus neighboring devices will not be affected by the heat.

As shown in FIG. 2, since the high frequency induction heating coils 26 are insulated by the thick photoresist pattern 29, a plurality of via holes 27 are formed, a copper layer are formed as a conductive layer, and an external power circuit terminal 28 is formed so that the high frequency induction heating coils 26 and the external power circuits are connected.

It is worth noting that the mold is not completely clamped until the plastic is fully filled. When the plastic is entirely filled into the cavity 22, a clamp unit (not shown) is used to apply a pressure to the cavity 22 for compressing the plastic. And the pressure is held after the plastic is filled.

Figure 5:
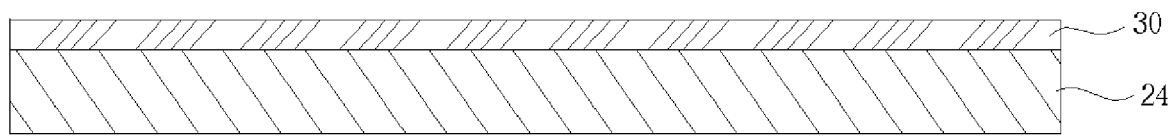
FIG. 5 to FIG. 12 are schematic diagrams illustrating steps of forming the high frequency induction heater according to the present invention.

Please refer to FIG. 5 to FIG. 12. FIG. 5 to FIG. 12 are schematic diagrams illustrating steps of forming the high frequency induction heater according to the present invention. As shown in FIG. 5, an aluminum substrate 24 is provided. Then a low pressure chemical vapor deposition (LPCVD) process is performed to deposit a silicon dioxide ($SiO_2$) layer 30 on the aluminum substrate 24 as an insulating layer. Please note that other insulating materials such as nitride can also be selected as the insulating layer. The aluminum substrate 24 is selected due to its high rigidity and lower induction heating ability of high frequency comparing to iron and nickel. On the contrary, a silicon substrate is not suitable for the present invention due to its fragility.

Figure 6:
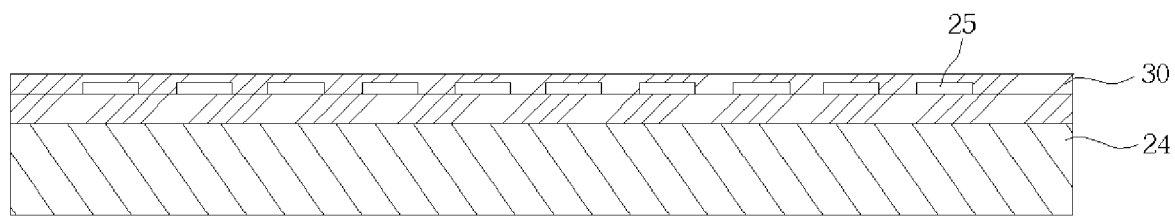

As shown in FIG. 6, a platinum layer (not shown) is formed by depositing on the aluminum substrate 24, and a lithography process (photo-etching process) including coating a photoresist pattern, exposing, developing, and etching is performed to form a plurality of thermometer detectors 25. Then another $SiO_2$ layer 30 or a nitride layer is deposited to cover the thermometer detectors 25, and a chemical vapor polishing (CMP) process is performed to planarize the $SiO_2$ layer 30.

Figure 7:
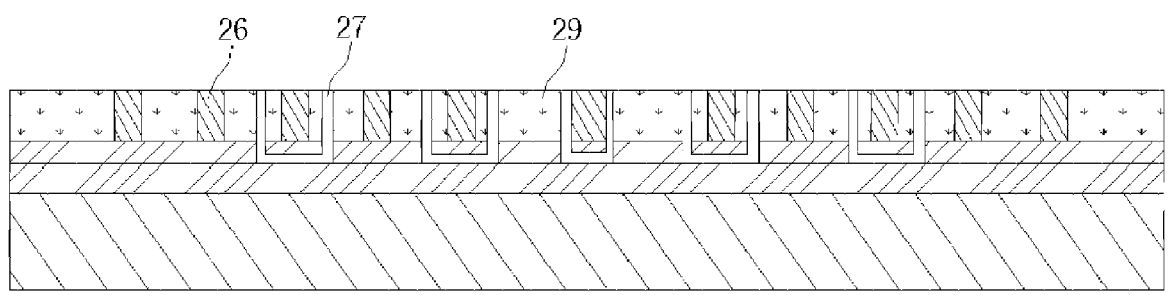

As shown in FIG. 7, a thick photoresist pattern 29 with high solidification strength is coated an exposure process and a development process are performed, and then a reactive ion etching (RIE) process is performed to form a plurality of via holes 27 connecting to the thermometer detector 25. Following that, an electroforming process is perform to electroform a copper pattern (not shown) for forming a plurality of high frequency heating coils 26 and the plurality of via holes 27 connecting to the thermometer detectors 25. Finally, a CMP process is performed to planarize the surface.

Figure 8:
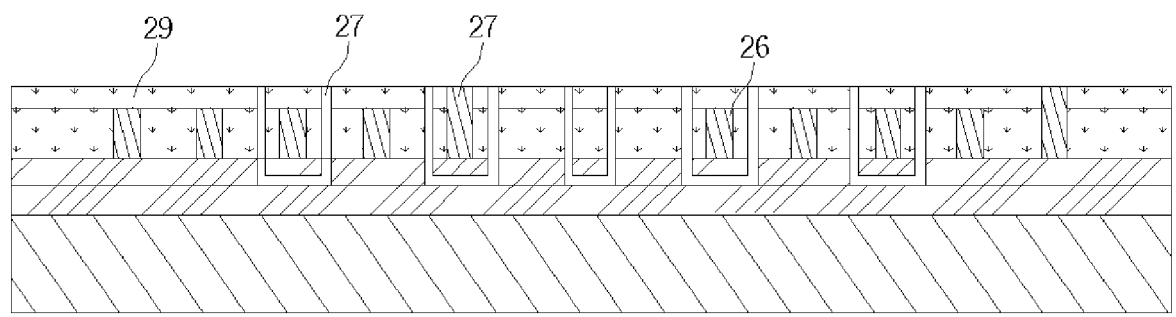

As shown in FIG. 8, thick photoresist pattern 29 with high solidification strength is coated, and an exposure process and a development process are performed. Then an electroforming process is performed to form the plurality of via holes 27. Then, a CMP process is performed to planarize the surface.

Figure 9:
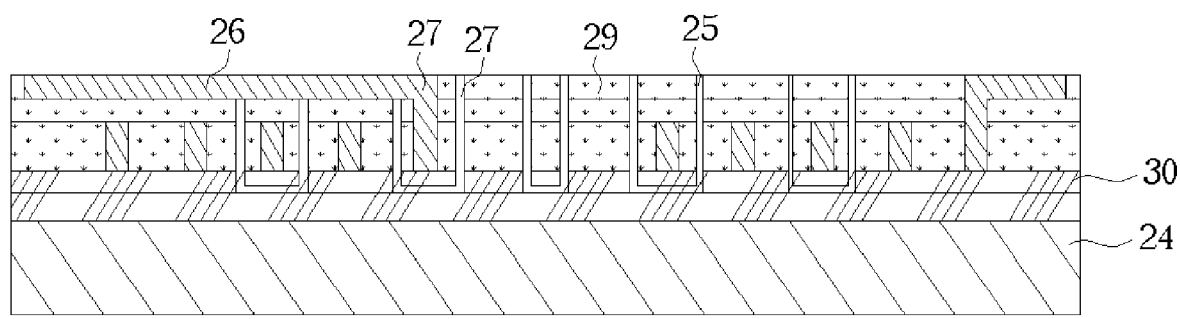

As shown in FIG. 9, the thick photoresist pattern 29 with high solidification strength is coated, an exposure process and a development, process are performed, and an electroforming process is performed to form the high frequency induction heating coils 26. Then, a CMP process is performed to planarize the Surface.

Figure 10:
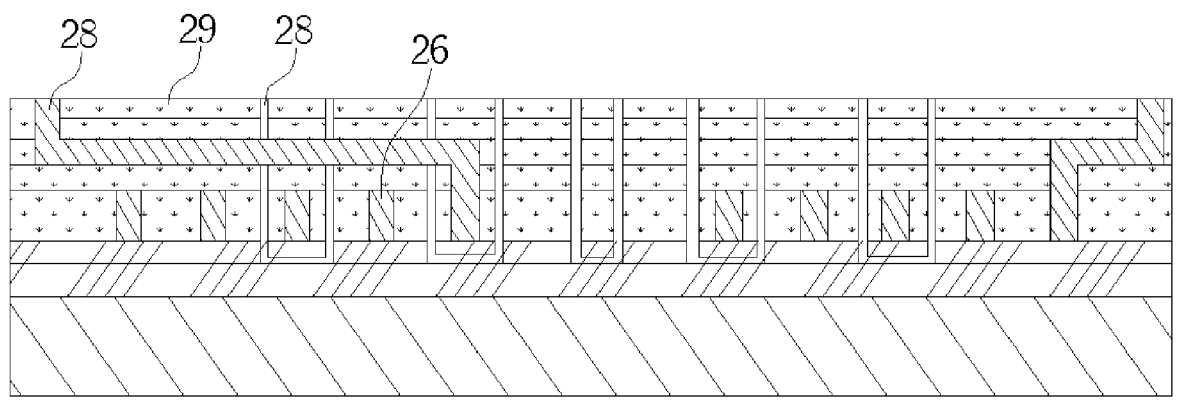

As shown in FIG. 10, the thick photoresist pattern 29 with high solidification strength is coated, an exposure process and a development process a performed, and an electroforming process is performed to form the high frequency induction heating coils 26 and an external power circuit terminal 28. Then, a CMP process is performed to planarize the surface.

Figure 11:
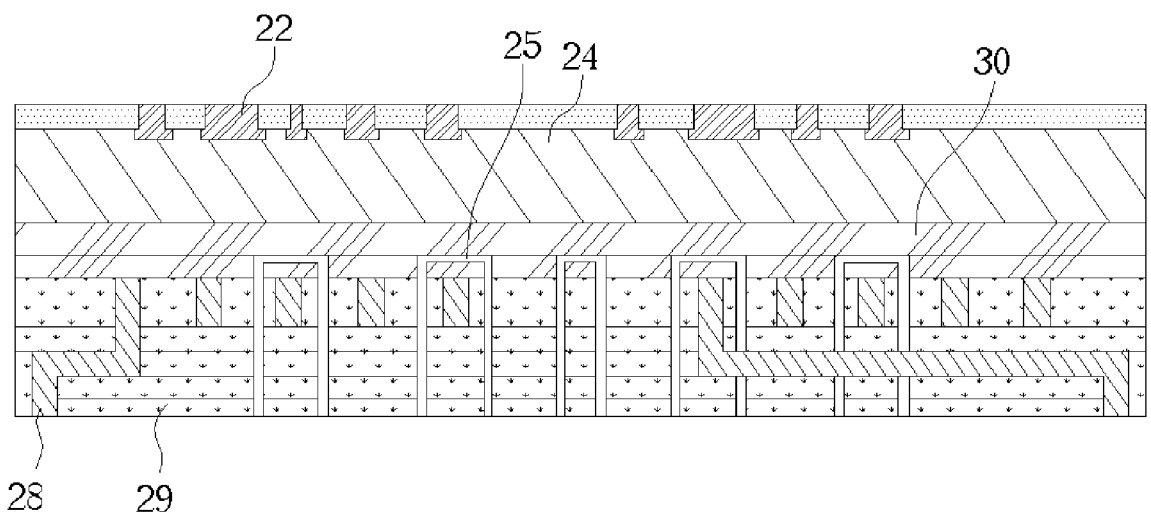

As shown in FIG. 11, the aluminum substrate 24 is turned over, and a photo-etching process is performed to form a photoresist pattern 29A and to etch the aluminum substrate 24. Then, an iron/nickel electroforming process is performed to form a microstructure 22.

Figure 12:
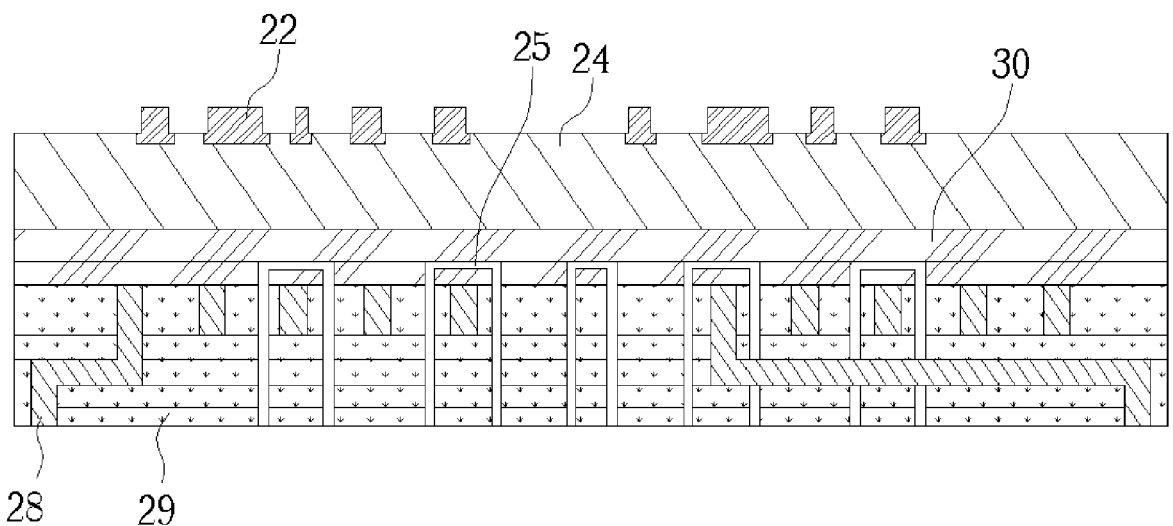

As shown in FIG. 12, a CMP process is performed to planarize the surface so that a high frequency induction heater built in an injection mold is fabricated.

In the above embodiment, the aluminum substrate 24 is selected as an example. However, other substrates having proper rigidity, conductivity, and magnetic conductivity, such as nickel substrate, can be adopted in the present invention.

In addition, the stamper 34 and the high frequency induction heating module 23 can be fabricated separately. In such case, after the external power circuit terminal 28 is formed, a polishing process can be carried out to fabricate the high frequency induction heater.

Figure 13:
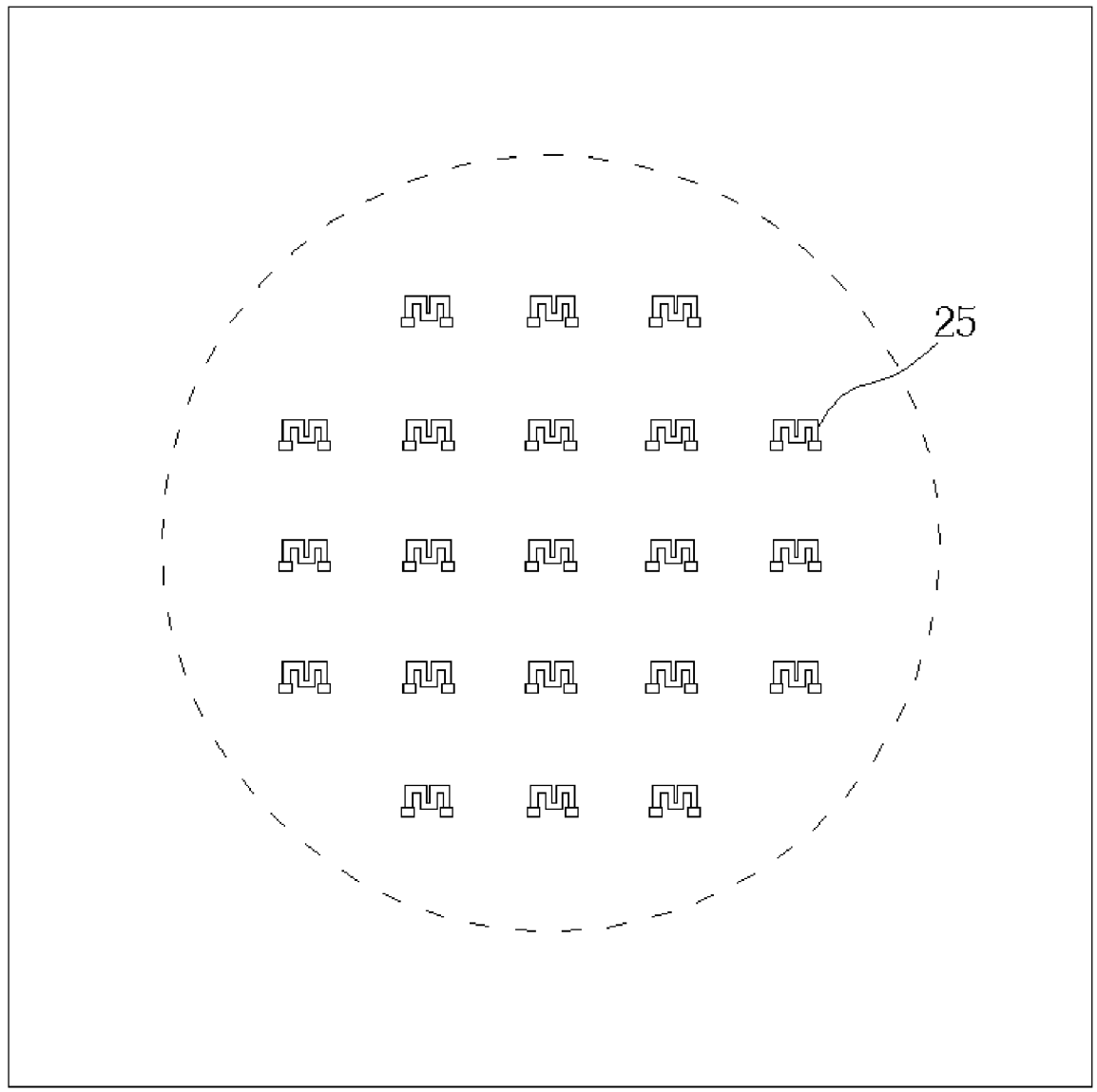
FIG. 13 is a schematic diagram illustrating the distribution of platinum resistance thermometer detectors (RTD) according to the present invention.

Please refer to FIG. 13. FIG. 13 is a schematic diagram illustrating the distribution of platinum resistance thermometer detectors (RTD) 25 according to the present invention. As shown in FIG. 13, a plurality of platinum RTDs 25 are positioned in places where the thickness is small for applying heat to the plastic so that the plastic remains fluid.

Figure 14:
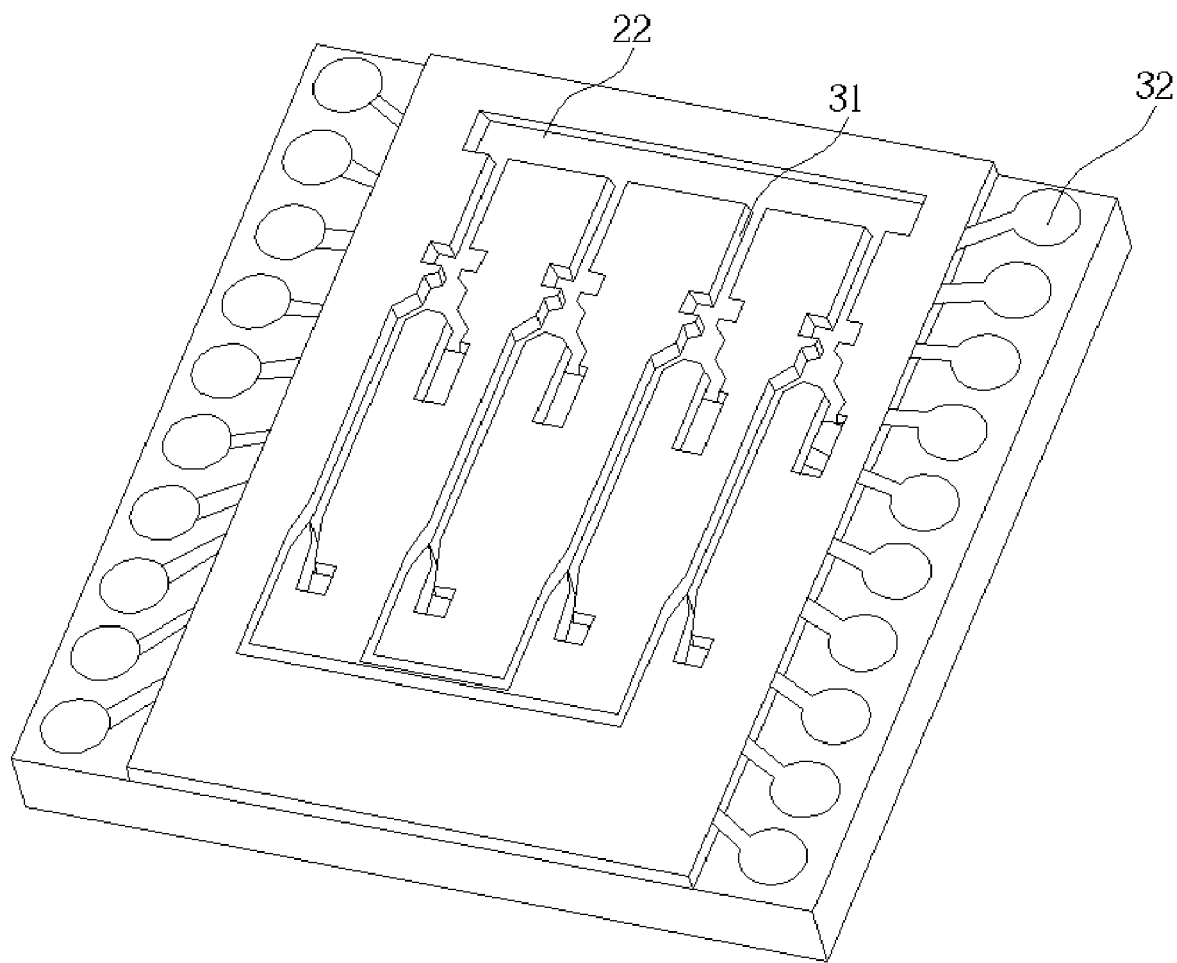
FIG. 14 is a schematic diagram illustrating micro channels of a bio chip.

The injection mold having a high frequency induction heater can be employed to fabricate various moldings having a microstructure thereon. Please refer to FIG. 14. FIG. 14 is a schematic diagram illustrating micro channels of a bio chip. The bio chip is for separating different bio polymers. The bio chip comprises cavities 22 and micro channels 31 on the surface, and micro electrodes 32 or micro heating module (not shown) on the bottom. Considering the hydrophile/hydrophobe and the biocompatibility problems, polymers are preferred as the material of bio chips. At present, the cross-sectional area of the micro channel 31 is about 20 $\mu m^2$ to 50 $\mu m^2$ while tracking depth of compact discs is only 0.5 $\mu m$, thus microstructure such as the micro channel 31 can be fabricated by injection compress molding technology.

Figure 15:
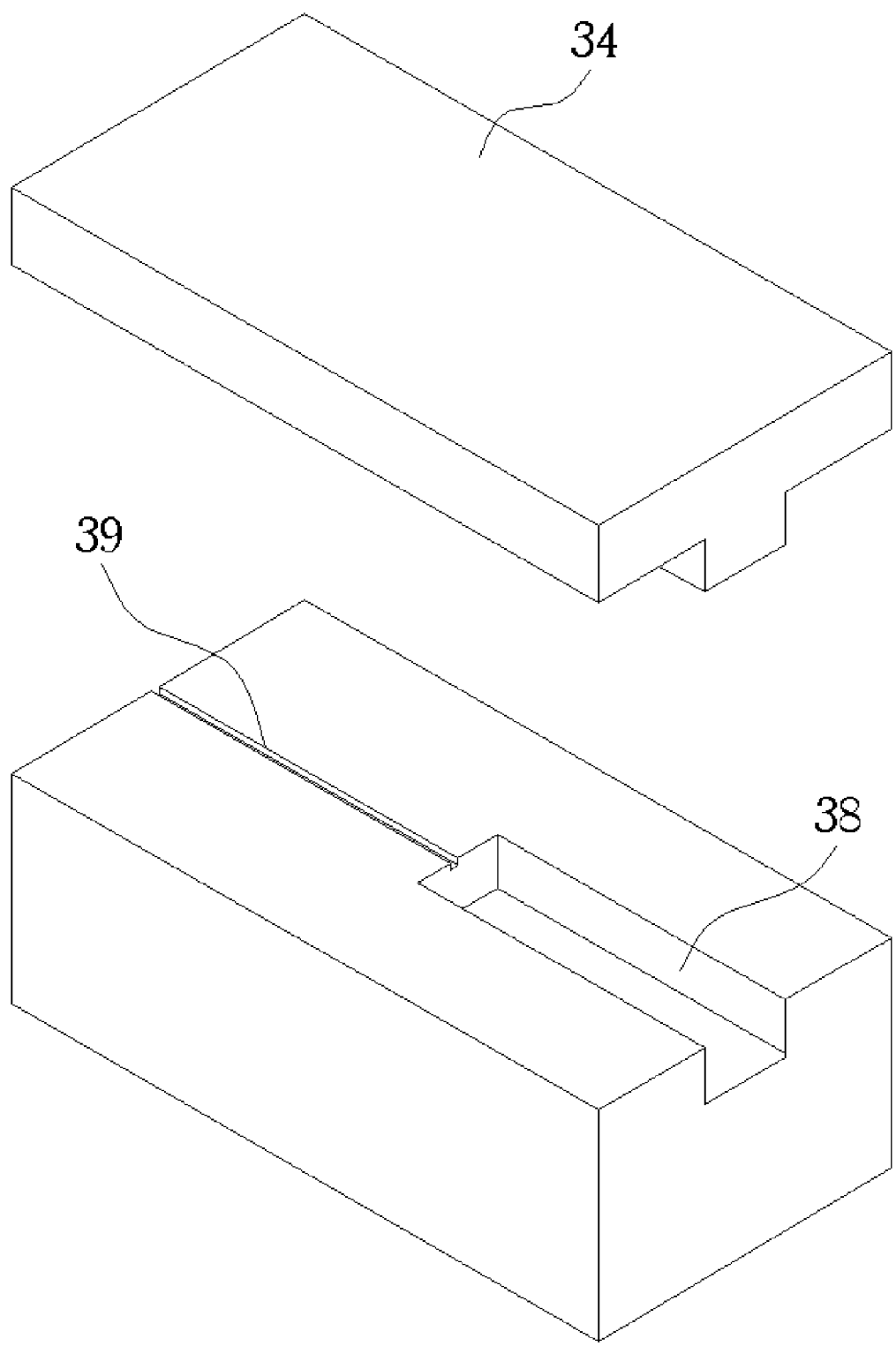
FIG. 15 and FIG. 16 are schematic diagrams illustrating a coupler of optical fiber.
Figure 16:
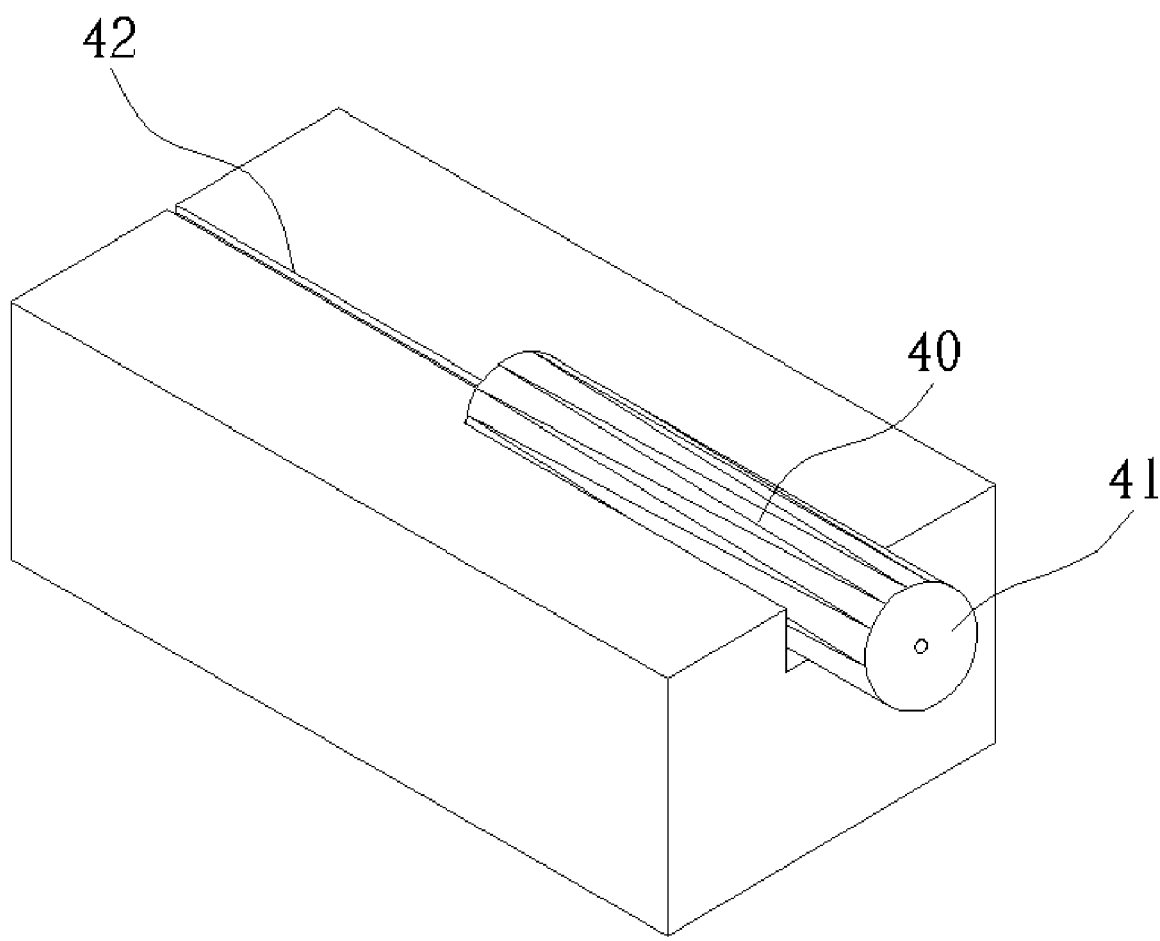

The present invention can also be employed to fabricated couplers of optical fiber. Since the coupler is mostly made of ceramics, if a stamper 34 fabricated by MEMS technology and LIGA technology is used to form the coupler, the production cost of optical fiber devices will be reduced. Please refer to FIG. 15 and FIG. 16. FIG. 15 and FIG. 16 are schematic diagrams illustrating a coupler of optical fiber. As shown in FIG. 15 and FIG. 16, the coupler comprises an optical fiber cavity 38 for placing an optical fiber 40, and a waveguide cavity 39. The waveguide cavity 39 is filled with a material identical to a core 41 of the optical fiber 40 for being a transmitting medium of optical signals. When the optical fiber 40 is introduced, the core 41 and a waveguide 42 are aligned correctly so that optical signals are transmitted out through the waveguide 42.

Figure 17:
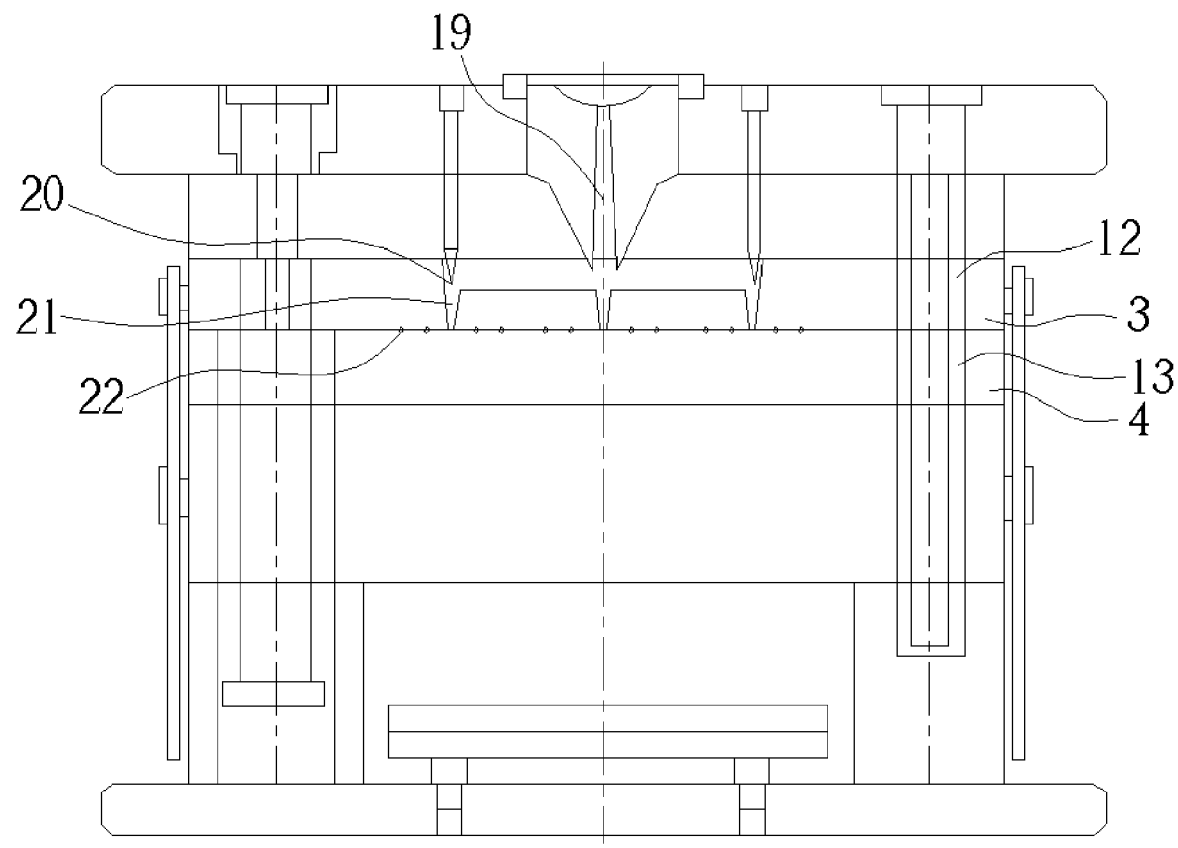
FIG. 17 is a schematic diagram of an injection mold for injecting a micro gear.
Figure 18:
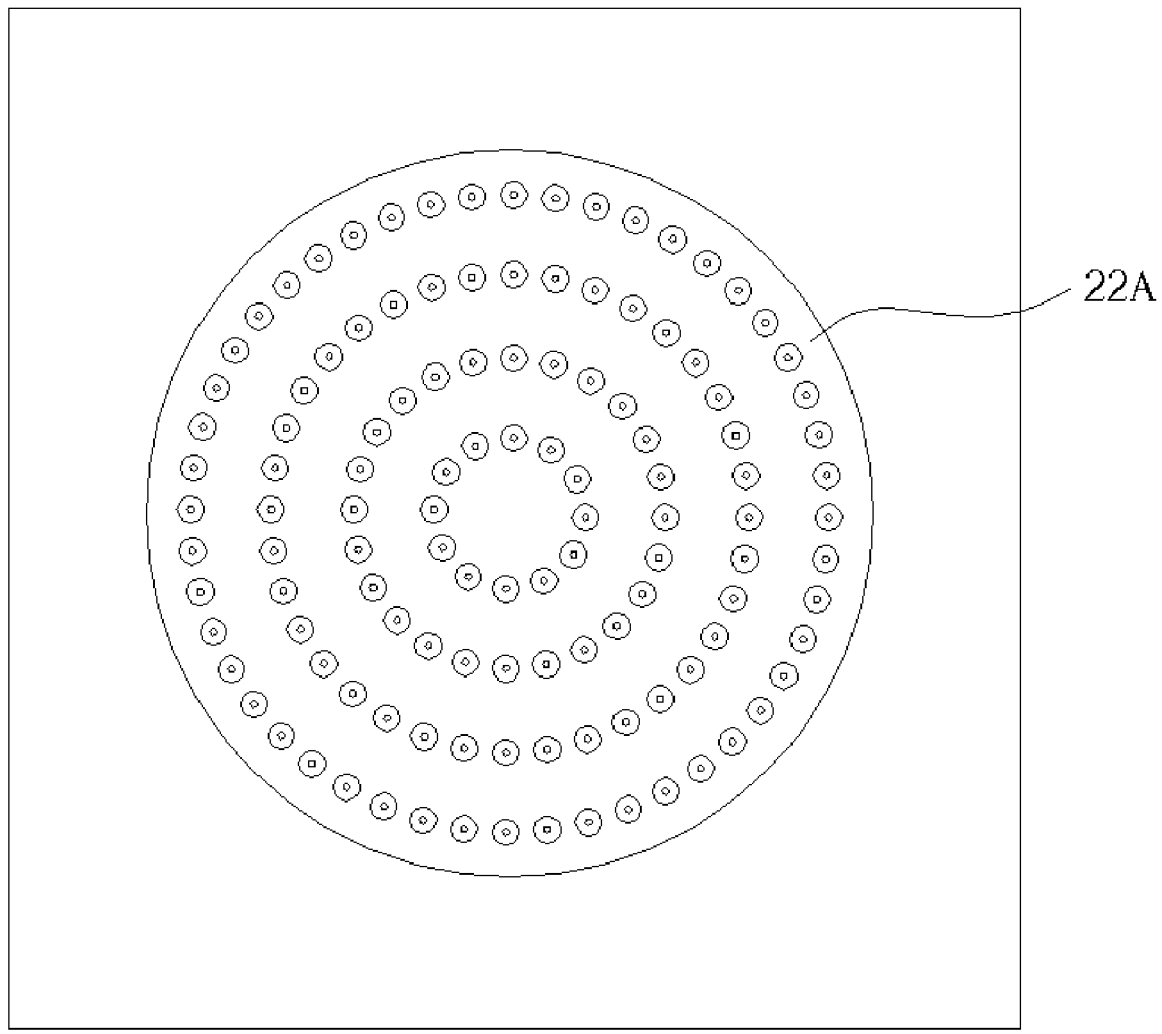
FIG. 18 is a schematic diagram illustrating bottom cavities of the injection mold shown in FIG. 17.
Figure 19:
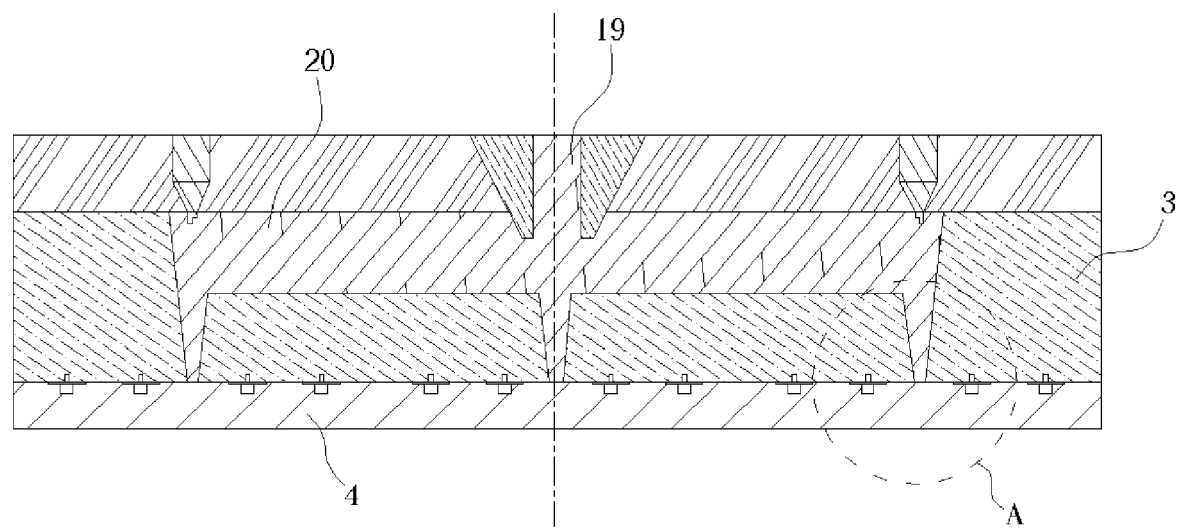
FIG. 19 is a schematic diagram illustrating a runner of the injection mold shown in FIG. 17.

Furthermore, the injection compression molding technology of the present invention can be adopted to fabricate micro gears for solving the poor fluidity problem. Please refer to FIG. 17 to FIG. 19. FIG. 17 is a schematic diagram of a gear injection mold. FIG. 18 is a schematic diagram illustrating bottom cavities 22A of the injection mold shown in FIG. 17.FIG. 19 is a schematic diagram illustrating a runner 20 of the injection mold shown in FIG. 17. As shown in FIG. 17, the melting plastic is ejected from a sprue 19, and flows to the cavities 22 through the runner 20. When the plastic flows through the stationary mold-half 03 and the movable mold-half 04, the plastic is cooled down thus the fluidity is reduced. In such case, the plastic cannot pass through the gate 21 so that the cavities 22 are not well filled. Therefore, a high frequency induction heating module (not shown) is installed to apply a local heat to the plastic for improving the low fluidity problem.

As shown in FIG. 18 and FIG. 19. The high frequency induction heating module 23 and the bottom cavities 22A are formed separately, and combined with the stationary mold-half 04. Top cavities (not shown) are installed on the movable mold-half 03. The high frequency induction heating module 23 can apply a local heat to the plastic and control the overall temperature distribution such that the temperature difference is reduced.

Figure 20:
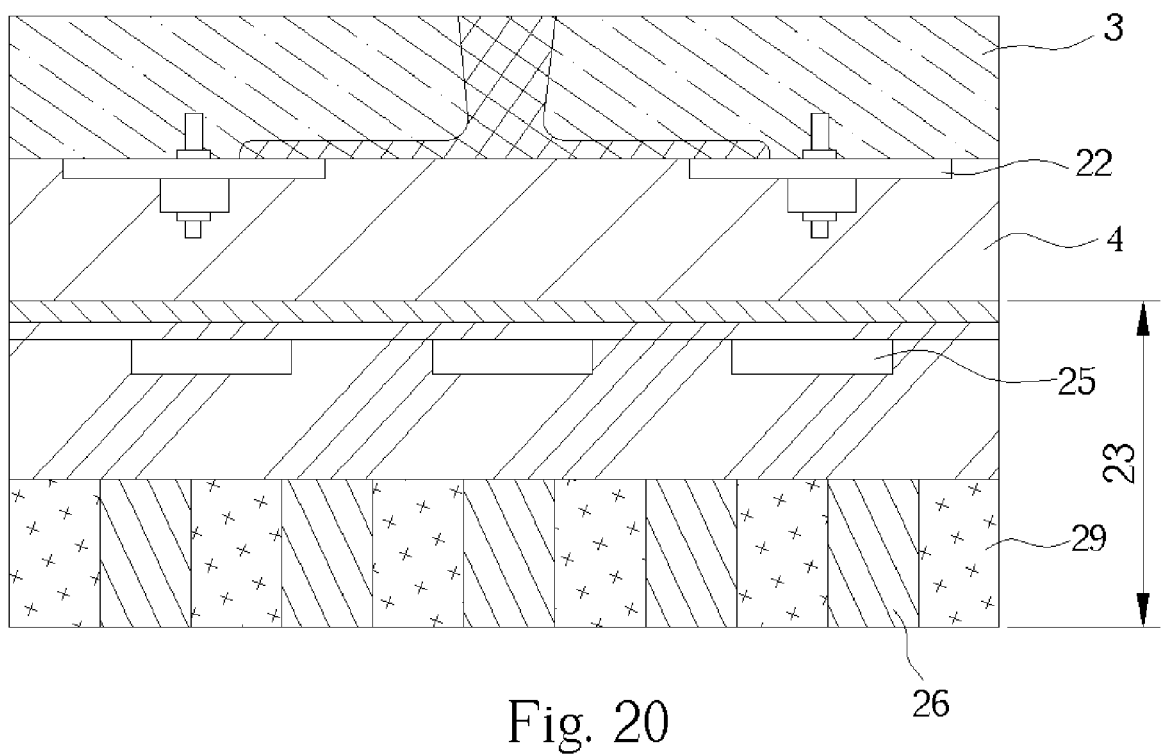
FIG. 20 is a local amplified diagram of the injection mold shown in FIG. 19.
Figure 21:
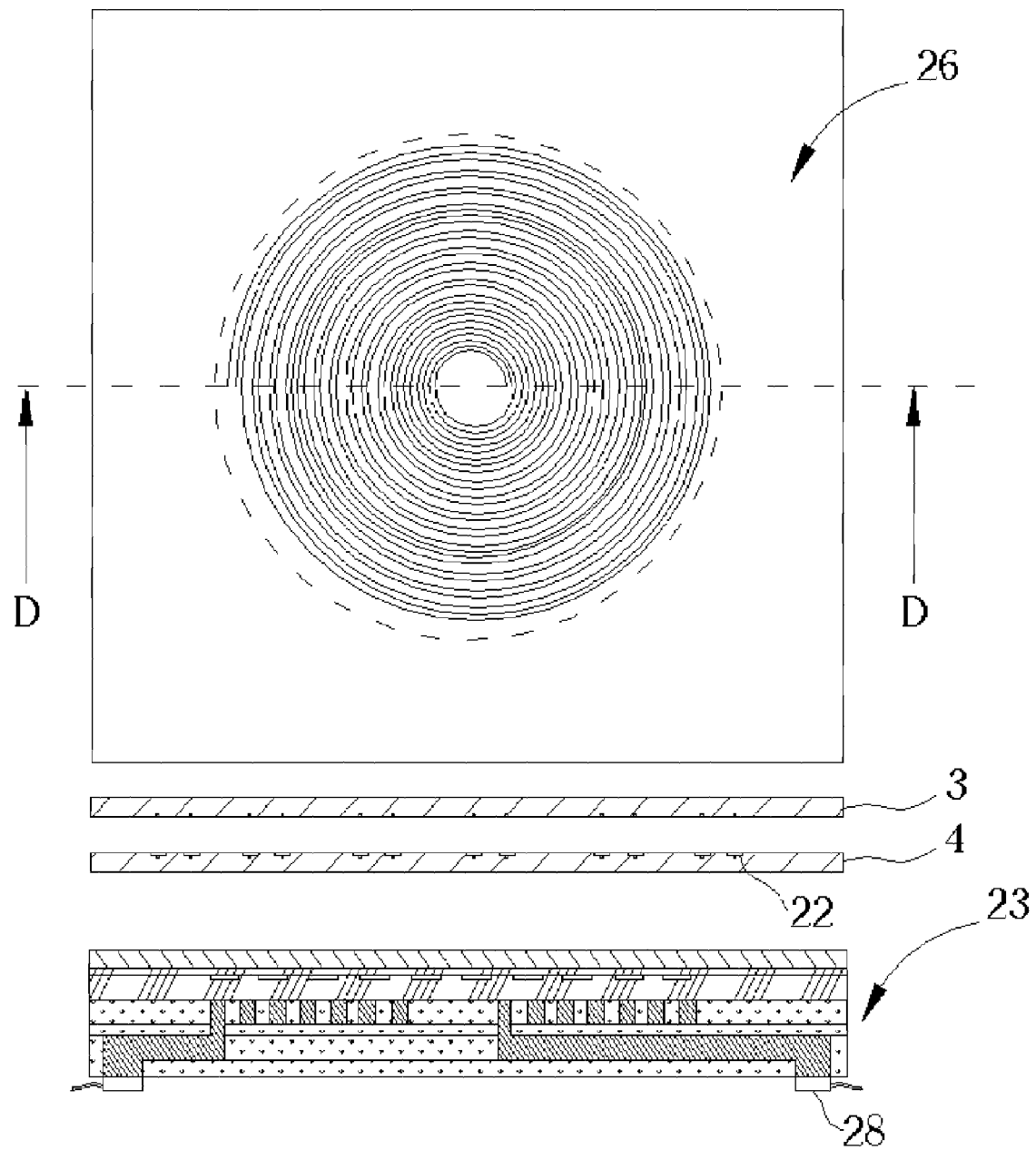
FIG. 21 is a schematic diagram illustrating the distribution of the high frequency induction heating coils according to another embodiment of the present invention.

Please refer to FIG. 20 and FIG. 21. FIG. 20 is a local amplified diagram of the injection mold shown in FIG. 19.FIG. 21 is a schematic diagram illustrating the distribution of the high frequency induction heating coils 26. This embodiment is similar to the first embodiment of the present invention. The difference between these two embodiments is the position of the high frequency induction heating module 23. In this embodiment, a multiple cavities injection mold for forming a plurality of parts is illustrated. Therefore, the production cost is reduced.

Those skilled in the art will readily appreciate that numerous modifications and alterations of the device may be made without departing from the scope of the present invention. Accordingly, the above disclosure should be construed as limited only by the metes and bounds of the appended claims.

What is claimed is:

1. A high frequency induction heater built in an injection mold comprising:
   at least a stamper, fabricated by micro electromechanical system (MEMS)technologies, having a micro pattern of a micro system;
   at least a high frequency induction heating module, fabricated by MEMS technologies, positioned on a side of the stamper, the high frequency induction heating module comprising at least a set of high frequency induction heating coils, the high frequency induction heating module being controlled by a driver positioned outside the injection mold; and
   at least a set of thermometer detectors, fabricated by MEMS technologies, positioned between the set of high frequency induction heating coils, the set of thermometer detectors being controlled by a temperature controller positioned outside the injection mold;
   wherein the high frequency induction heating module emits electromagnetic waves which penetrate the stamper and applies a local heat to a plastic such that sections of the plastic having a thin thickness or sections having a large difference of cross sectional areas remains fluid, in such case the micro pattern of the micro system is accurately transferred to the plastic by injection compression molding technologies.

2. The high frequency induction heater of claim 1 wherein the MEMS technologies comprise the following steps:
   (a) depositing an oxide layer or a nitride layer onto a metal substrate as an insulating layer;
   (b) depositing a platinum layer, and performing a photo-etching process which includes coating a photoresist pattern, exposing, developing, and etching, for defining a thermometer detector pattern;
   (c) depositing an oxide layer or a nitride layer as an insulating layer to cover the thermometer detector pattern;
   (d) coating a thick photoresist pattern with high solidification strength, performing an exposure process and a development process, electroforming a copper layer to a desirable height, and performing a chemical mechanical polishing (CMP) process to planarize the copper layer for forming the set of high frequency induction heating coils;
   (e) coating a thick photoresist pattern with high solidification strength, performing an exposure process and a development process, electroforming a copper layer to a desirable height, and performing a CMP process to planarize the copper layer for forming via boles;
   (f) coating a thick photoresist pattern with high solidification strength, performing an exposure process and a development process, electroforming a copper layer to a desirable height, and performing a CMP process to planarize the copper layer for forming an external power circuit; and
   (g) polishing the metal substrate.

3. The high frequency induction heater of claim 2 wherein the stamper and the high frequency induction heater are fabricated individually or jointly, and if the stamper and the high frequency induction heater are fabricated jointly, then step (g) is further defined by the following steps:
   turning the metal substrate over;
   performing a photo-etching process to etch the metal substrate;
   performing an electroforming process to form a magnetic layer comprising iron and nickel for forming a microstructure; and
   performing a CMP process to planarize the magnetic layer for forming an insert mold having a built-in high frequency induction heater.

4. The high frequency induction heater of claim 1 wherein a microstructure is inserted into the stamper by MEMS electroforming technologies, and the high frequency induction heater positioned under the microstructure or the stamper is capable of applying the local heat and controlling an overall temperature so that the plastic is fluid and a deformation due to a temperature difference is prevented.

5. The high frequency induction heater of claim 4 wherein a material of the microstructure is a metal identical to that of the stamper or a metal differing from that of the stamper, the material identical to that of the stamper is for controlling the overall temperature, the metal differing from that of the stamper is for applying the local heat, if the material of the microstructure differs from that of the stamper, the microstructure then has a higher magnetic permeability or a higher induction heating ability than the stamper.

6. The high frequency induction heater of claim 1 wherein the set of high frequency induction heating coils are positioned under a surface of the high frequency induction heater, thus a multi-level interconnect technology is adopted to locate the external power circuit in a bottom layer, and only a microstructure of the set of high frequency induction heating coils is exposed in an upper layer.

7. The high frequency induction heater of claim 1 being capable of being positioned in a stationary mold-half and/or in a movable mold-half.

8. The high frequency induction heater of claim 1 wherein the high frequency induction heater and the thermometer detectors are control led by a plurality of drivers and temperature controllers operating individually.

9. The high frequency induction heater of claim 1 being capable of fabricating wafer-level plastic discs (6 inches to 8 inches) by injection compression molding technologies, and further performing a wafer-level package process on a substrate having ICs or MEMS elements.

* * * * *